United States Patent [19]

Ranck

[11] Patent Number: 4,725,651
[45] Date of Patent: Feb. 16, 1988

[54] POLYMERIC BLEND COMPOSITION OF A VINYLIDENE CHLORIDE INTERPOLYMER AND A THERMOPLASTIC COPOLYESTER

[75] Inventor: Dan E. Ranck, Sanford, Mich.
[73] Assignee: The Dow Chemical Company, Midland, Mich.
[21] Appl. No.: 809,830
[22] Filed: Dec. 17, 1985
[51] Int. Cl.⁴ .................... C08L 67/02; C08L 27/06; C08L 27/08
[52] U.S. Cl. .................................... 525/173; 525/165
[58] Field of Search ................................ 525/173, 165

[56] References Cited

U.S. PATENT DOCUMENTS 2,647,098  7/1953  Smith ................................... 524/308
2,853,464  9/1958  Dilke ................................... 525/165
3,686,361  8/1972  DeWitt ................................. 525/165
3,896,066  7/1975  Ranck .................................. 525/165

FOREIGN PATENT DOCUMENTS 58-46222  10/1983  Japan .

Primary Examiner—Patricia A. Short

[57] ABSTRACT

A polymeric blend composition comprising a vinylidene chloride interpolymer and a thermoplastic copolyester resin, said polymers being miscible. The vinylidene chloride interpolymer is present in an amount of from about 1 to about 80 weight percent based on total polymeric blend composition weight. The thermoplastic copolyester resin is present in an amount of from 20 to about 99 weight percent based on total polymeric blend composition weight. The blends exhibit physical properties superior to those expected by the rule of mixtures.

7 Claims, No Drawings

POLYMERIC BLEND COMPOSITION OF A VINYLIDENE CHLORIDE INTERPOLYMER AND A THERMOPLASTIC COPOLYESTER

BACKGROUND OF THE INVENTION

The present invention relates generally to a blend of two polymeric compositions. Specifically, the present invention relates to a blend of a vinylidene chloride interpolymer and a thermoplastic copolyester resin.

Vinylidene chloride interpolymers are well known in the prior art. Vinylidene chloride interpolymers are known for their high barrier to mass transport of atmospheric gases and water vapor. Unfortunately, vinylidene chloride interpolymers have limited areas of application because of their poor processing characterisitics and mechanical properties. Specifically, vinylidene chloride interpolymers, when fabricated, tend to have low tensile strength and low impact strength.

Similarly, thermoplastic copolyester resins are well-known in the prior art. Copolyester resins are well-known for their excellent mechanical properties. Specifically, copolyester resins possess relatively high tensile strength and relatively high impact strength. Unfortunately, copolyester resins provide a relatively low degree of barrier to mass transport of atmospheric gases and water vapor when compared to vinylidene chloride interpolymers.

It is desirable to produce a polymeric composition possessing the desirable properties of both a vinylidene chloride interpolymer and a copolyester resin. It is further desirable that such a polymeric composition be transparent. It is to this goal that the present invention is directed.

SUMMARY OF THE INVENTION

The present invention concerns a polymeric blend composition comprising:
(a) from about 1 to about 80 weight percent, based on total polymeric blend composition weight, of a vinylidene chloride interpolymer, the interpolymer having polymerized therein vinylidene chloride in an amount of from about 40 to about 98 percent by weight of interpolymer and at least one monoethylenically unsaturated monomer copolymerizable therewith in an amount of from about 60 to about 2 percent by weight of interpolymer; and
(b) from 20 to about 99 weight percent, based on total polymeric blend composition weight, of a thermoplastic copolyester resin which resin is miscible with the vinylidene chloride interpolymer.

DETAILED DESCRIPTION OF THE INVENTION

Vinylidene chloride interpolymers suitable for use in the present invention suitably comprise vinylidene chloride in an amount of from about 40 to about 98 percent by weight of interpolymer, beneficially from about 50 to about 96 percent by weight of interpolymer, and desirably from about 60 to about 94 percent by weight of interpolymer.

The vinylidene chloride interpolymers of the present invention comprise one or more monoethylenically unsaturated monomers which are copolymerizable with vinylidene chloride. The monoethylenically unsaturated monomer copolymerizable with vinylidene chloride is present in an amount of from about 60 to about 2 percent by weight of interpolymer, beneficially from about 50 to about 4 percent by weight of interpolymer, and desirably from about 40 to about 6 percent by weight of interpolymer.

Monoethylenically unsaturated monomers suitable for use in the present invention include vinyl chloride, alkyl acrylates, alkyl methacrylates, acrylic acid, methacrylic acid, itaconic acid, acrylonitrile, and methacrylonitrile. The monoethylenically unsaturated monomers are desirably selected from the group consisting of vinyl chloride, alkyl acrylates and alkyl methacrylates, the alkyl acrylates and alkyl methacrylates having from about 1 to about 8 carbon atoms per alkyl group. The alkyl acrylates and alkyl methacrylates beneficially have from about 1 to about 4 carbon atoms per alkyl group. The alkyl acrylates and alkyl methacrylates are preferably selected from the group consisting of methylacrylates, ethylacrylates, and methyl methacrylates.

Methods of forming the vinylidene chloride interpolymer suitable for use in the present invention are well-known in the prior art. Also in accordance with known techniques, one or more conventional additives may be incorporated in the vinylidene chloride interpolymers of the present invention. Examples of such additives include plasticizers, pigments, thickeners, stabilizers, and pH adjusters.

As used herein, the term "copolyester" refers to polyesters whose synthesis uses more than one polyhydric alcohol and/or more than one dibasic acid. The thermoplastic copolyester resins suitable for use in the present invention are formed from an acidic component and a polyol component. The acidic component comprises one or more dibasic acid. The polyol component comprises more than one polyhydric alcohol. As used herein, the term "polyol" refers to a polyhydric alcohol.

Dibasic acids suitable for use in forming the thermoplastic copolyesters suitable for use in the present invention include aromatic and aliphatic dibasic acids having from 4 to 20 carbon atoms. Exemplary of suitable dibasic acids are terephthalic acid, hexanedioic acid, nonanedioic acid, decanedioic acid, dodecanedioic acid, and eicosanedioic acid. Beneficially, the acidic component comprises terephthalic acid alone, or a mixture of terephthalic acid and one or more dibasic acid other than terephthalic acid. In one preferred embodiment of the present invention, the acidic component comprises terephthalic acid alone.

The polyol component suitable for use in the present invention comprise more than one polyhydric alcohol. Exemplary of the polyhydric alcohols suitable for use in the polyol component of the present invention are the alkylene glycols, alicyclic glycols, polyoxyalkylene glycols, and aromatic glycols. Exemplary of suitable alkylene glycols are those alkylene glycols having from 3 to 20 carbon atoms such as ethylene glycol, 1,2-propylene glycol, trimethylene glycol, 1,4-butane diol, pentane diol, neopentyl glycol, hexamethylene glycol, octamethylene glycol, nonamethylene glycol, and decamethylene glycol. Exemplary of suitable alicyclic glycols are 1,4-cyclohexane dimethanol and cyclohexane diethanol. Exemplary of suitable polyoxyalkylene glycols are diethylene glycol, triethylene glycol, and tetraethylene glycol. Exemplary of suitable aromatic glycols are the ethylene oxide or propylene oxide adduct of bisphenol A, or the ethylene oxide or propylene oxide adduct of bisphenol sulfone.

Beneficially, the polyol component used to form the thermoplastic copolyester resin comprises ethylene glycol and one glycol other than ethylene glycol. In one preferred embodiment of the present invention, the polyol component comprises ethylene glycol and 1,4-cyclohexane dimethanol.

Methods of forming the thermoplastic copolyester resins suitable for use in the present invention are well-known in the prior art. Any method of forming a thermoplastic copolyester is suitable for use in the present invention. One suitable method involves the esterification of the acidic component with the polyol component followed by a polycondensation reaction to form the polymer. Another suitable method involves an ester interchange reaction followed by a polycondensation reaction.

The present invention concerns a polymeric blend composition. The vinylidene chloride interpolymer is present in the polymeric blend composition in an amount of from about 1 to about 80 weight percent, beneficially from about 50 to about 80 weight percent, and preferably from about 60 to about 75 weight percent based on total weight of the polymeric blend composition. The thermoplastic copolyester resin is present in the polymeric blend compositions according to the present invention in an amount of from 20 to about 99 weight percent, beneficially from 20 to about 50 weight percent, and desirably from about 25 to about 40 weight percent, based on total weight of the polymeric blend composition.

The acidic component and the glycolic component are selected so that the copolyester produced therefrom is miscible with the vinylidene chloride interpolymer. The copolyester and the vinylidene chloride interpolymer are considered miscible when a blend of the polymers results in a composition which exhibits a single glass transition temperature.

The vinylidene chloride interpolymers of the present invention are miscible with the thermoplastic copolyester resins of the present invention. It was expected that the physical properties of the polymeric blend compositions according to the present invention would be consistant with a straight line volume fraction relationship of the blend components (hereinafter referred to as "the rule of mixtures"). Applicants have unexpectedly discovered that the physical properties of the polymeric blend compositions of the present invention are not in accord with the physical properties which would be expected by applying the rule of mixtures. Instead, the polymeric blend compositions according to the present invention exhibit physcial properties superior to those predicted by the rule of mixtures. This synergistic effect has heretofore been unrecognized.

Because the vinylidene chloride interpolymers of the present invention are miscible with the thermoplastic copolyester resins of the present invention, the blends of the present invention are transparent. For many applications for which the blends of the present invention are suited, it is desirable that said blends be transparent.

In addition to the vinylidene chloride interpolymer and the thermoplastic copolyester resin, the polymeric blend compositions of the present invention may contain minor amounts of additives. Additive type and amount depends on several factors. One factor is the intended use of the blend. A second factor is the tolerance of the blends for the additive. That is, how much additive can be added to the blend before adversely affecting the physical properties of the blend to an unacceptable level. Other factors to consider are apparent to those skilled in the art of polymer formulation and compounding.

Additives which may be incorporated into the compatibilized blends of the present invention are represented by the group consisting of heat stabilizers, light stabilizers, pigments, processing aids, lubricants and the like. Typically, such additives will be present in blend compositions according to the present invention in an amount of less than about 10 weight percent.

The polymeric blend compositions of the present invention are readily prepared by using conventional melt processing techniques provided two conditions are met. First, melt processing must be accomplished at a temperature below that at which decomposition of the vinylidene chloride interpolymer becomes significant. Second, sufficient shear must be generated during melt processing to provide a visually homogeneous blend within a reasonable mixing time.

Conventional melt processing equipment which may be used includes heated two roll compounding mills, Brabender mixers, Banbury mixers, single screw extruders, twin screw extruders, and the like. Desirable results are obtained when an extruder, either single screw or twin screw, is used for melt processing the polymeric blend compositions of the present invention.

One factor in determing satisfactory mixing times is the melt index of the components of the polymeric blend composition. If component melt indexes are nearly equal, relatively short mixing time yields satisfactory results. If there is a disparity among component melt indexes a longer mixing time is necessary. Another factor in determining satisfactory mixing times is temperature. As noted hereinbefore, an upper limit on temperature is the temperature at which decomposition of the vinylidene chloride interpolymer becomes significant. A lower limit on temperature is dictated by the polymeric blend component which has the greatest melting point or melting range. If the temperature does not exceed the melting point or melting range of that polymeric blend component, a visually homogenous melt will be difficult, if not impossible, to obtain.

The polymeric blend compositions of the present invention can be used to form a variety of cast, blown, extruded, molded, injection molded, or calendered articles. Physical properties of the blend depend largely upon two factors. One factor is the selection of the polymeric components of the polymeric blend composition, a second factor is a ratio of polymeric components to each other within said polymeric blend composition.

The present invention is illustrated and further detailed by the following examples. The examples are for purposes of illustration only and are not to be construed as limiting the scope of the present invention. All parts and percentages are by weight unless otherwise specifically noted.

EXAMPLES AND COMPARATIVE EXAMPLE

Blend compositions according to the present invention are prepared in the following manner. The vinylidene chloride interpolymer employed is a copolymer of vinylidene chloride and vinyl chloride. The vinylidene chloride copolymer is formed from a monomer mixture and about 20 weight percent vinyl chloride, based on total copolymer weight. The thermoplastic copolyester resin employed is formed from an acidic component comprising terephthalic acid and a polyol component comprising ethylene glycol and 1,4-cyclohexane dimethanol. The thermoplastic copolyester resin is commercially available from the Eastman Kodak Company under the trade designation KODAR PETG Copolyester 6763.

The vinylidene chloride copolymer and the thermoplastic copolyester resin are blended in varying ratios. The ratios are set forth in Table I.

The blends are formed by melt blending the vinylidene chloride interpolymer and the thermoplastic copolyester resin in an extruder. The extruder is a 5.08 centimeter Single Screw Hartig extruder. The extruder has a length to diameter ratio of 12:1. The extruder has the following set temperatures: (a) hopper temperature=160° C.; (b) melt zone temperature=170° C.; and (c) die temperature=185° C.

In a first stage the blend composition components are added to the extruder hopper and thereafter converted to a molten blend within the extruder. The molten blend is extruded through a single strand die, passed through a water bath, and then pelletized. The strand die had an internal diameter of 0.32 centimeters. Pelletizing is accomplished using a Model 304, 15.24 centimeter Strand Cutter commercially available from Conair, Inc.

The resulting pellets are then subjected to a second extrusion process. The pellets are fed into an extruder hopper, converted to a molten blend, and extruded through a tape die to form a tape having a width of about 5.08 centimeters and a thickness of about 0.42 centimeters.

The tapes were then compression molded to prepare test specimens. A stainless steel template measuring 16.5 centimeters by 16.5 centimeters by 0.16 centimeters was used to prepare a sample sheet from which test specimens were cut. A "sandwich" was created by (a) placing the template on a sheet of polyester film having a thickness of about 0.009 centimeters, (b) placing about 65 grams of the tapes side-by-side on the template, and (c) covering the template and strips with a second sheet of polyester film.

The sandwich was placed into a compression molding press. It was first processed for a period of one minute at a temperature of 175°–180° C. and at a force of about 909 kilograms. The sanwich was then processed for an additional period of two minutes at the same temperature but at a force of about 15,909 kilograms. After the additional period, the sandwich was allowed to cool to a temperature of about 25° C. before being removed from the press. The sample sheet was then separated from the sandwich. Test specimens are cut from the sample sheet. The test specimens are annealed by being subjected to a set temperature of about 60° C. for a period of 16 hours in a convection air oven. The oven is commercially available from Precision Scientific, Inc., under the trade designation Model 625.

After being annealed, the test specimens are further conditioned prior to testing. The test specimens are placed in a controlled humidity room having a relative humidity of 50±5 percent and a temperature of 23±2° C. for a period of 24 hours.

The modulus of the test specimens is determined according to American Society for Testing and Materials Test Method D-638.

The oxygen permeability of the test specimens is measured on an instrument commercially available from Model Controlled Inc. under the trade designation OXTRAN 1050.

The results of the physical property testing are set forth in Table I.

TABLE I

| Sample No. | % VDC[1] | % PETG[2] | Modulus (× $10^5$)[3] | Oxygen Permeability[4] |
|---|---|---|---|---|
| 1* | 0 | 100 | 3.14 | 17.00 |
| 2 | 40 | 60 | 3.01 | 1.41 |
| 3 | 50 | 50 | 3.34 | 0.92 |
| 4 | 60 | 40 | 3.69 | 0.64 |
| 5 | 70 | 30 | 4.08 | 0.55 |
| 6 | 80 | 20 | 3.85 | 0.31 |
| 7* | 90 | 10 | 2.79 | 0.27 |
| 8* | 100 | 0 | 1.66 | 0.15 |

*Comparative example. Not an example of the present invention.
[1] weight percent of vinylidene chloride interpolymer based on total weight of blend composition
[2] weight percent of thermoplastic copolyester based on total weight of blend composition
[3] Modulus (× $10^5$) in pounds per square inch as determined by ASTM-638.
[4] Oxygen Permeability in (cubic centimeters of oxygen)(mil of sample thickness)/100 square inches (day)(atmosphere of pressure).

As can be seen from the above table, the compositions of the present invention possess a modulus strength which would be unexpected in view of the fact that the blend compositions of the present compositions are miscible. That is, the blends have physical properties which are superior to the physical properties of the blend components alone. Compositions of the present invention display an oxygen permeability less than that which one skilled in the art would expect.

What is claimed is:
1. A polymeric blend composition comprising:
   (a) from about 1 to about 80 weight percent, based on the total polymeric blend composition weight, of a vinylidene chloride interpolymer, the interpolymer having polymerized therein vinylidene chloride in an amount of from about 60 to about 98 percent by weight of interpolymer and at least one monoethylenically unsaturated monomer copolymerizable therewith in an amount of from about 40 to about 2 percent by weight of the interpolymer; and
   (b) from 20 to about 99 weight percent, based on total polymeric blend composition weight, of a thermoplastic copolyester resin, said thermoplastic copolyester being miscible with the vinylidene chloride interpolymer and being formed from terephthalic acid and ethylene glycol and 1,4-cyclohexane dimethanol.
2. The polymeric blend composition of claim 1 wherein the monoethylenically unsaturated monomer copolymerizable with the vinylidene chloride is selected from the group consisting of vinyl chloride, alkyl acryaltes, alkyl methacrylates, acrylic acid, methacrylic acid, itaconic acid, acrylonitrile, and methacrylonitrile.
3. The polymeric blend composition of claim 2 wherein the monoethylenically unsaturated monomer copolymerizable with the vinylidene chloride is an alkyl acrylate, the alkyl acrylate having from about 1 to about 8 carbon atoms per alkyl group.
4. The polymeric blend composition of claim 3 wherein the alkyl acrylate is selected from the group consisting of methyl acrylate and ethylacrylate.
5. The polymeric blend composition of claim 2 wherein the monoethylenically unsaturated monomer copolymerizable with vinylidene chloride is vinyl chloride.
6. The polymeric blend composition of claim 5 wherein the amount of vinyl chloride is from about 6 to about 40 percent by weight of interpolymer and the amount of vinylidene chloride is from about 94 to about 60 percent by weight of interpolymer.
7. The polymeric blend composition of claim 1 wherein the vinylidene chloride interpolymer is present in the blend composition in an amount of from about 60 to about 75 weight percent, based on total polymer blend composition weight, and the thermoplastic copolyester resin is present in the blend composition in an amount of from about 40 to about 25 weight percent, based on total blend composition weight.

* * * * *